March 9, 1926.
E. A. WATTS
LUBRICATING SYSTEM
Filed Nov. 28, 1924
1,576,385
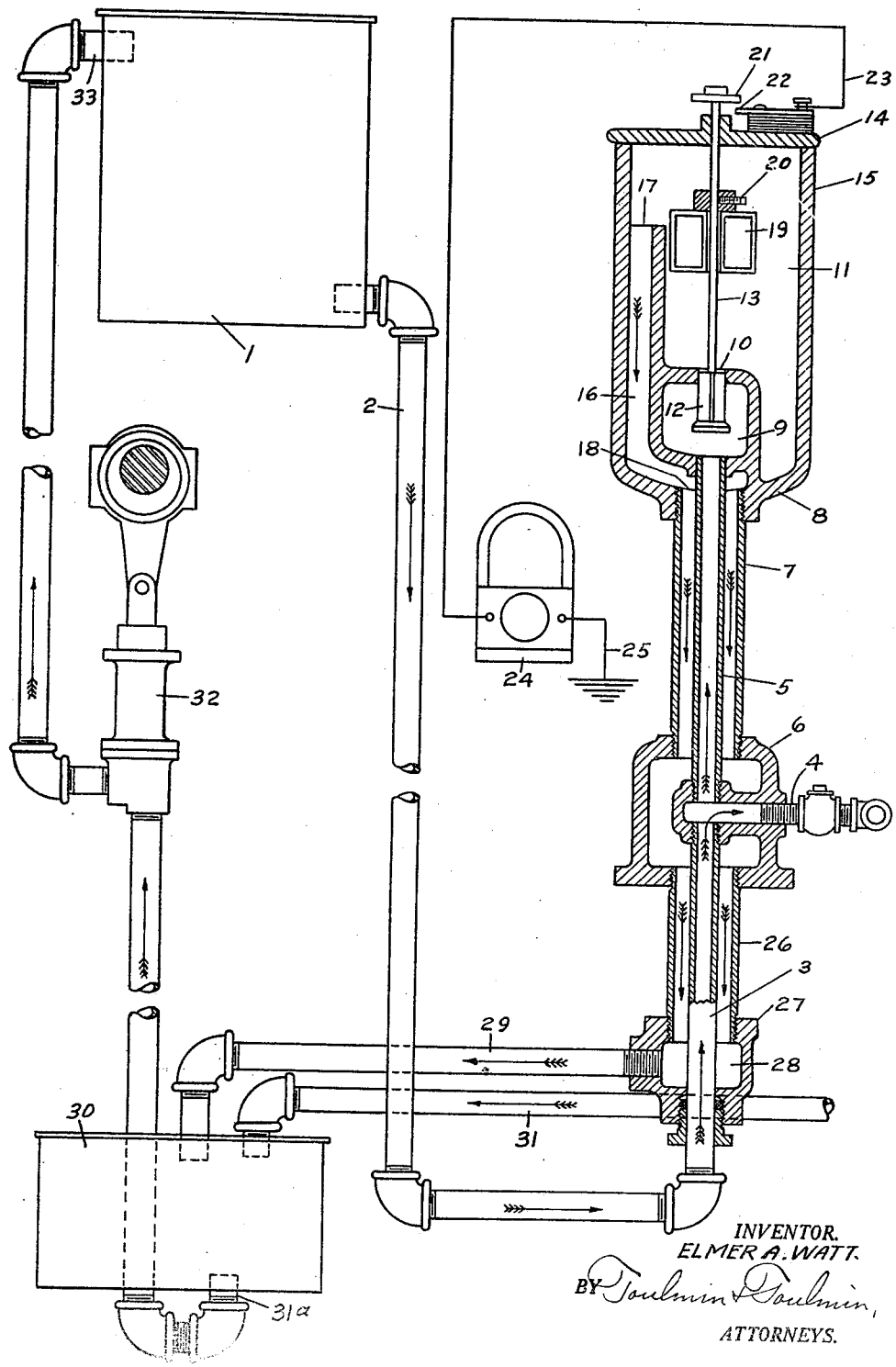
INVENTOR.
ELMER A. WATT.
BY Toulmin & Toulmin,
ATTORNEYS.

Patented Mar. 9, 1926.

1,576,385

UNITED STATES PATENT OFFICE.

ELMER A. WATTS, OF SPRINGFIELD, OHIO, ASSIGNOR TO THE MILLER IMPROVED GAS ENGINE COMPANY, OF SPRINGFIELD, OHIO, A CORPORATION OF OHIO.

LUBRICATING SYSTEM.

Application filed November 28, 1924. Serial No. 752,665.

*To all whom it may concern:*

Be it known that I, ELMER A. WATTS, a citizen of the United States, residing at Springfield, in the county of Clark and State of Ohio, have invented certain new and useful Improvements in Lubricating Systems, of which the following is a specification, reference being had therein to the accompanying drawing.

My invention relates to a lubricating system, and in particular to a lubricating system for an internal combustion engine.

It is the object of my invention to provide means of circulating oil to an internal combustion engine and of stopping the engine if a sufficient quantity of oil cannot be circulated to it, particularly in connection with a system of gravity feed of oil to the engine.

It is an additional object of my invention to provide means of preventing the oil from overflowing from the system when the engine is stopped or when other causes may occur which would deliver an excessive quantity of oil to certain parts of the system, causing it to overflow.

It is a further object of my invention to provide a constantly circulating system which has two general pathways, one through the reservoir mechanism and the other through the engine.

It is the object of my invention to provide a system in which the oil from a gravity tank may be delivered by gravity to an engine, with the excess passing back to a reservoir to which the oil from the engine also passes. The oil from this reservoir is pumped back again to the filter or gravity tank. In the event the flow of oil decreases to a dangerous point, the ignition is short-circuited in the engine. In the event the oil increases beyond a given point, valve mechanism will close to prevent an overflow of the oil. Thus it is my object to prevent damage both from a decrease in the proper amount of oil and an excessive increase of such oil.

Referring to the drawings, there is shown a diagrammatic view partially in section of the several parts constituting the system.

In this drawing, 1 is a filter tank placed in such a position that it is above the engine and other portions of the mechanism in this oil system. Oil from the filter tank is fed out of the bottom thereof through the pipe 2 to a point adjacent the engine whence it is delivered upwardly through the pipe 3 to a point where it may pass out through the pipe 4 to the engine and the surplus may continue to pass upwardly through the pipe 5. An enlarged casting 6 forms a casing for supporting these pipes and for forming the T connection between the pipes 3, 4 and 5. This same casing supports an outer spaced concentric pipe 7 which is larger than the pipe 5. The upper end of the pipe 7 supports the casing 8. This casing is formed into three chambers. The pipe 5 is introduced into the valve chamber 9, the exit from which is marked 10, into the float chamber 11. This passageway 10 is closed by the valve member 12 on the rod 13 which is guided in the cover plate 14 on top of the outside wall 15 of this casing. This outside wall 15 forms the major portion of the wall for the float chamber 11.

The third chamber in this casing 8 is the chambered passageway 16 which communicates at 17, at its top, with the float chamber a predetermined distance below the top thereof, and communicates at its bottom at 18, with the open mouth of the pipe 7.

On the stem 13 is fixed a float 19 by the set screw 20. On top of the stem 13 on the outside of the casing 8 is carried a contact member 21 adapted to engage the contact member 22 to which is connected a wire 23 leading to the magneto 24 which is in turn grounded by the wire 25.

Below the casing 6 and carried thereby is an enlarged pipe 26 which is concentric with the pipe 3. This pipe carries at its lower end a casing 27 which forms a chamber 28. Communicating with this chamber is the pipe 29 leading to the tank 30. Also communicating with the tank 30 is the pipe 31 which is the return line from the engine carrying the oil which has been used back to the tank 30. At the bottom of this tank 30 is located a pipe 31ª which is used to drain the tank and deliver the oil through the agency of the pump 32 to the top of a filter tank as at 33.

*Operation.*—As to the operation of this system and mechanism, the oil flows from the gravity tank 1 by gravity through the pipe 2, pipe 3 and into the engine through the pipe 4. The surplus not needed by the engine passes upwardly into the valve chamber 9 through the orifice 10 into the float chamber 11 and thence into the return passageway 16. The surplus passes down the pipe 7 through the pipe 29 into the tank 30 where it is joined by excess oil from the engine through pipe 31. This oil is then returned by the pump 32 through the pipe 31ª to the top of the filter tank.

If the oil is not sufficient to keep the float in the tank 11 at a point where the contacts 21 and 22 will be out of engagement then the magneto will be short-circuited and the engine stopped.

If, however, there is more than enough oil the excess amount of oil will lift the float 19, the stem 13 and the valve member 12, close the orifice 10 and prevent the delivery of excess oil and the overflowing of the tank 11.

It will be understood that I desire to comprehend within my invention such modifications as may be necessary to adapt it to varying conditions and uses.

Having thus fully described my invention, what I claim as new and desire to secure by Letters Patent of the United States, is:—

1. In an oiling system, a gravity supply tank, means of delivering oil by gravity to an engine, means of passing an excess of oil not needed by the engine to a valve chamber, a valve in said valve chamber adapted to stop the passage of the excess oil when it exceeds a predetermined amount to prevent its overflowing, a float chamber and a float therein adapted to actuate said valve in preventing said overflow, and means for normally returning the excess oil to a reservoir and means of returning the oil from the engine to said reservoir, and means of returning the oil from the reservoir to the source of gravity supply.

2. In an oiling system, a gravity supply tank, means of delivering oil by gravity to an engine, means of passing an excess of oil not needed by the engine to a valve chamber, a valve in said valve chamber adapted to stop the passage of the excess oil when it exceeds a predetermined amount to prevent its overflowing, a float chamber and a float therein adapted to actuate said valve in preventing said overflow, means for normally returning the excess oil to a reservoir and means of returning the oil from the engine to said reservoir, means of returning the oil from the reservoir to the source of gravity supply, and means associated with said system to short circuit the engine and stop it when the level of the oil in the float chamber falls below a predetermined amount.

3. In an oiling system, a gravity supply tank, means of supplying an engine therefrom, means of circulating a portion of said oil through a valve chamber, a float chamber and a by-pass return line to a reservoir, a valve in said valve chamber to seal it from the float chamber, a rod carrying said valve in said float chamber, and a reciprocating float in said float chamber whereby when the amount of oil in the float chamber exceeds a predetermined level, the valve will close and prevent further delivery of oil to the float chamber until normal conditions are restored, and a reservoir below the engine for receiving the excess oil not circulated therethrough, and for receiving the excess oil circulated therethrough, a return line from said reservoir to the gravity supply tank and a pump in said return line for lifting the oil from the reservoir to the gravity tank.

4. In an oiling system, a gravity supply tank, means of supplying an engine therefrom, means of circulating a portion of said oil through a valve chamber, a float chamber and a by-pass return line to a reservoir, a valve in said valve chamber to seal it from the float chamber, a rod carrying said valve in said float chamber, and a float in said float chamber whereby when the amount of oil in the float chamber exceeds a predetermined point, the valve will close and prevent further delivery of oil to the float chamber until normal conditions are restored, a reservoir below the engine for receiving the excess oil not circulated therethrough, and for receiving the excess oil circulated therethrough, a return line from said reservoir to the gravity supply tank and a pump in said return line for lifting the oil from the reservoir to the gravity tank, a contact member carried on the end of the valve rod, a second contact member normally remote therefrom but associated therewith connected to a magneto, a magneto which is grounded on one side, whereby when the float in the float chamber drops below a predetermined point said contact members will engage, the magneto will be short-circuited, and the engine will be stopped.

5. In a lubricating system, a gravity filter tank, an exit pipe leading from the bottom thereof to an engine, an integral casing, a by-pass line taking the surplus oil not needed by the engine to the casing which is divided into a valve chamber, a float chamber and a by-pass line or chamber, a valve chamber, a float chamber, and a by-pass chamber, a float in the float chamber, a valve to close a passageway from the valve chamber to the float chamber, a rod connected to said valve and said float, a return line connected to said by-pass line in the casing to a reservoir, said return line being concentric with the supply line and means connected with the float for short-circuiting the engine when the float descends below a predetermined point in the float chamber, a reservoir to receive the return oil not used by the engine and not circulated through it and also adapted to receive oil from the engine which is circulated through it, said reservoir being below the rest of the system, and a return line from the reservoir to the top of the filter tank and a pump for moving the oil therethrough In testimony whereof, I affix my signature.

ELMER A. WATTS.